Patented May 8, 1951

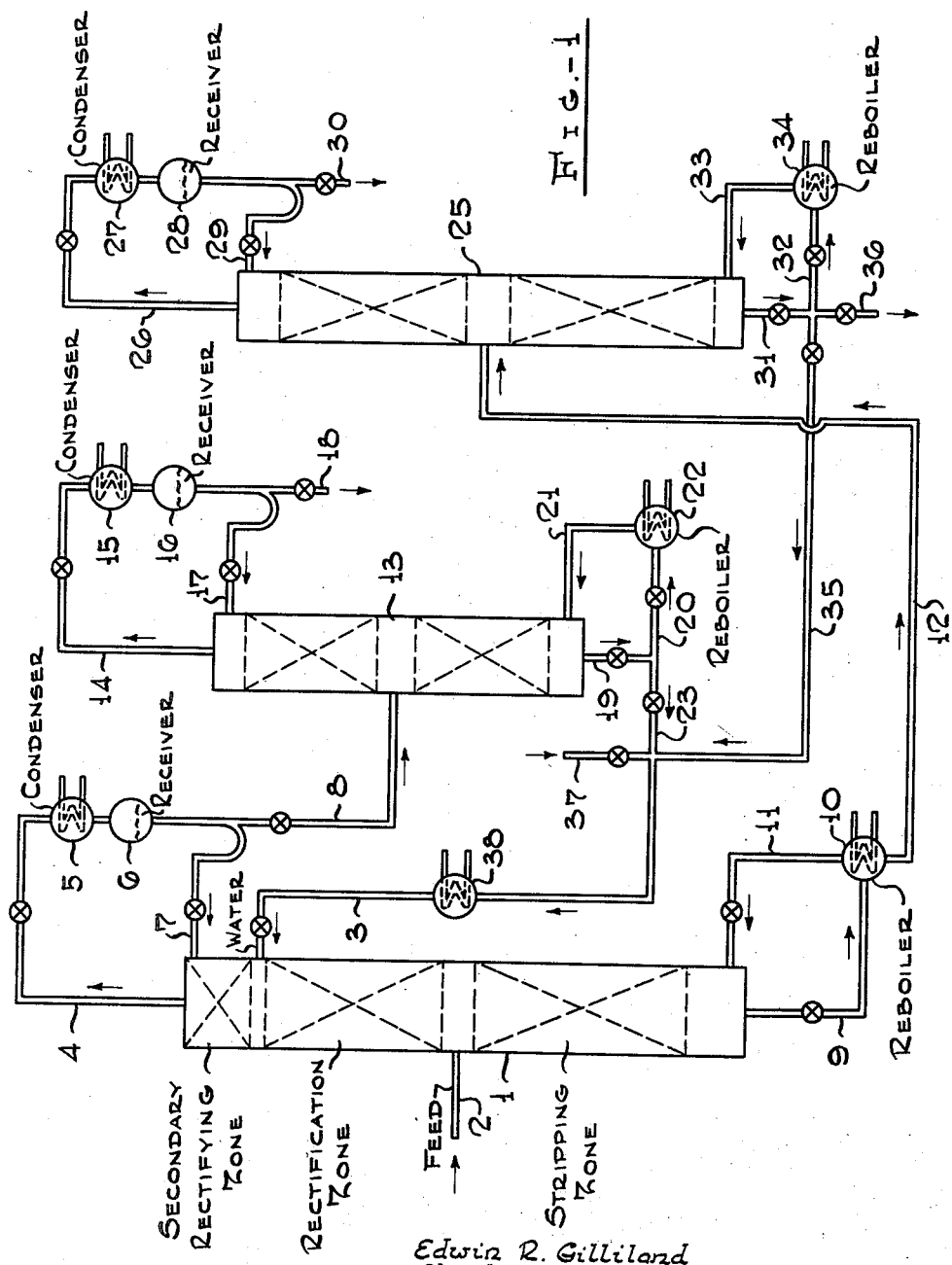

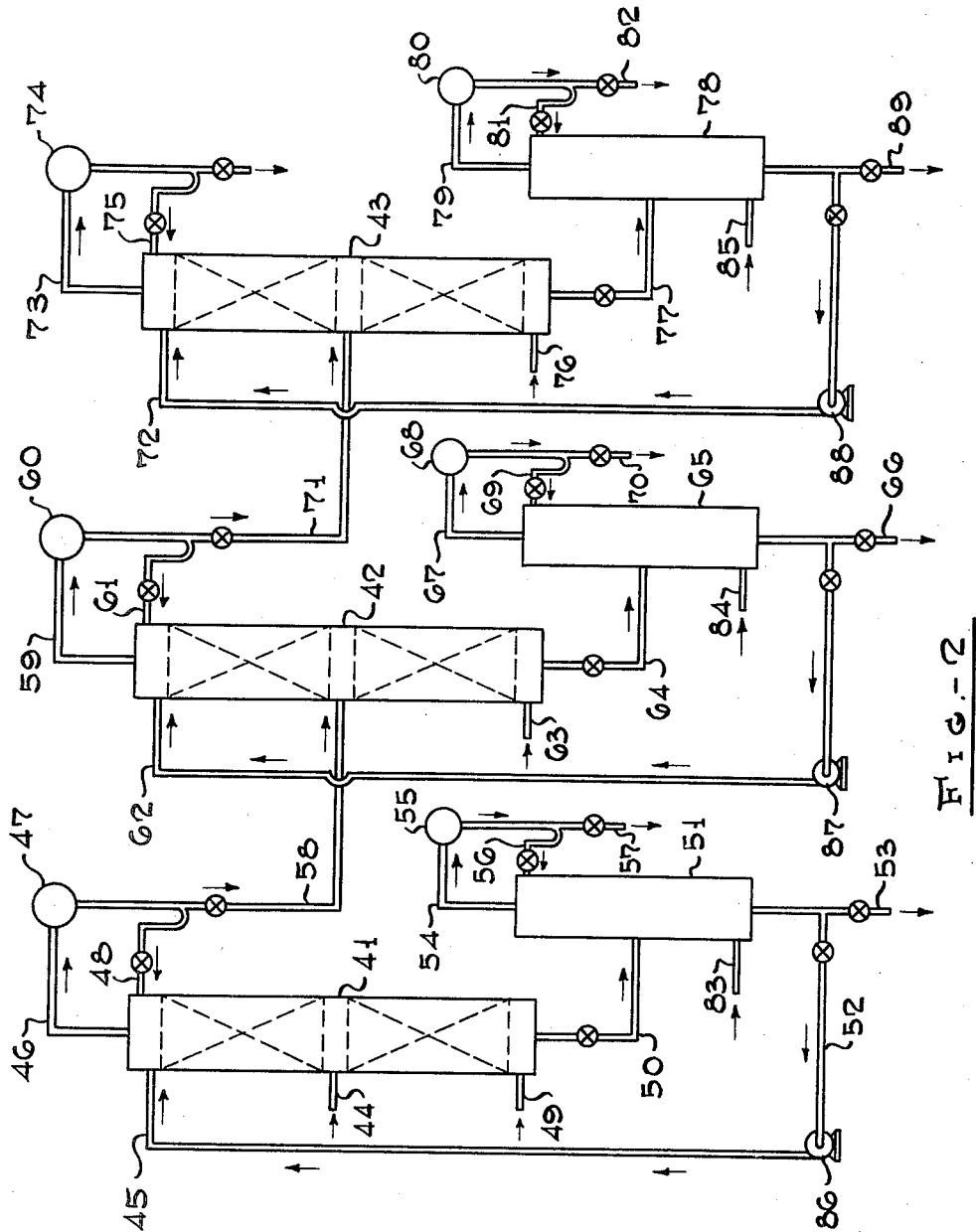

2,551,593

UNITED STATES PATENT OFFICE 2,551,593

EXTRACTIVE DISTILLATION OF ALCOHOLS FROM CLOSE-BOILING AQUEOUS MIXTURES

Edwin R. Gilliland, Arlington, Mass., and Charles E. Morrell, Westfield, and Carl S. Carlson and Nat C. Robertson, Elizabeth, N. J., assignors to Standard Oil Development Company, a corporation of Delaware Application January 28, 1947, Serial No. 724,840

13 Claims. (Cl. 202—39.5)

This invention relates to a practical method of separating close-boiling oxygenated organic compounds, particularly to isolate water-miscible alcohols of different molecular weights which form close-boiling aqueous azeotropes, such as ethyl and isopropyl alcohols. It is concerned with a controlled use of water as a refluxing medium in a continuous fractional distillation of the close-boiling alcohols.

It is known that water has been used in steam and azeotropic distillations of alcohols and other organic compounds of widely divergent boiling points and water miscibilities. For example, in the rectification of ethyl alcohol from an aqueous mixture containing amyl alcohol (fusel oil), the aqueous azeotrope of ethyl alcohol is distilled overhead while the amyl alcohol, which has a considerably higher boiling point than ethyl alcohol and is less miscible with water, concentrates in the middle of the fractionating column, leaving the remaining water at the bottom of the column. However, in a normal distillation of close-boiling alcohols from their aqueous mixtures, these alcohols concentrate in the upper part of a fractionating column with azeotropic proportions of water and the mixed close-boiling alcohols distill overhead with a limited amount of water. Accordingly, it has been difficult to separate the alcohols which boil closely together, especially those of similar water miscibilities and which form aqueous azeotropes that boil closely together. Such close-boiling alcohols are frequently obtained in aqueous mixtures with varying amounts of water in their syntheses. Since these compounds are generally similar in miscibilities with various solvents and are accompanied with varying proportions of water and organic impurities, extraction methods are difficult to use for their separation, also.

An object of this invention is to provide a commercially feasible process for efficient separation of close-boiling alcohols which are similarly miscible with water and which are difficult to separate by ordinary fractional distillation methods.

The process with which the present invention is concerned is best applied to distillation cuts or mixtures of which the organic components distill as compounds or azeotropes within a narrow boiling range. An example is an aqueous mixture of ethyl alcohol (anhydrous, B. P. 78.5° C.; aqueous azeotrope, B. P. 78.1° C.) with isopropyl alcohol (anhydrous, B. P. 82.3° C.; aqueous azeotrope, B. P. 80.4° C.). Other examples include narrow-boiling range mixtures containing such alcohols and neutral oxygenated organic compounds of other classes, such as ketones, aldehydes, ethers, esters, ketals, and acetals, when such components or their azeotropes boil within a narrow range.

Some of the above-described mixtures are obtained by an olefin hydration reaction, e. g., when a mixture of ethylene and propylene is absorbed in sulfuric acid, diluted, hydrolyzed, and a resulting aqueous alcohol mixture is stripped out. Another important source of such mixtures is the Fischer synthesis hydrogenation of carbon monoxide, especially when the aqueous layer product formed contains not only lower primary and secondary alcohols but also various ketones, aldehydes, ethers, acetals, esters, carboxylic acids, and certain tertiary alcohols. Still another source is in the products of hydrocarbon oxidation where both oil and water layers are obtained, both containing oxygenated organic compounds.

It is quite feasible to obtain the narrow-boiling range mixtures containing two or more close boiling oxygenated organic compounds from crude aqueous mixtures by conventional distillations. Narrow-boiling range mixtures which may be obtained by the ordinary distillation processes from aqueous solution are as follows:

TABLE I
*Narrow-boiling range alcohol mixtures*

| Group | Components | Normal B. Pt., °C. | Aqueous Azeotrope B. Pt., °C. |
|---|---|---|---|
| I | Ethyl Alcohol | 78.5 | 78.1 |
|   | Isopropyl Alcohol | 82.3 | 80.4 |
| II | Ethyl Alcohol | 78.5 | 78.1 |
|    | Isopropyl Alcohol | 82.3 | 80.4 |
|    | Methyl Ethyl Ketone | 79.6 | 73.6 |
| III | Ethyl Alcohol | 78.5 | 78.1 |
|     | Isopropyl Alcohol | 82.3 | 80.4 |
|     | t-Butyl Alcohol | 83.0 | 79.9 |

The narrow-boiling range mixture may be a binary or tertiary mixture, as in the groups shown, but, generally, the crude mixtures contain additional oxygenated organic compounds, which do not interfere with the basic operation of this invention in isolating the principal alcohol components of the mixtures. It is to be noted that the aqueous azeotropes of the alcohols in such mixtures have boiling points which differ by less than five centigrade degrees.

A typical crude ethanol cut obtained from a water layer of a Fischer synthesis process contains the following:

TABLE II
*Ethanol cut*

| Compounds | Anhydrous B. Pt., °C. | Aqueous Azeotropes B. Pt., °C. |
|---|---|---|
| n-Butyraldehyde | 75.7 | 65. |
| Ethyl Acetate | 77.1 | 70.4 |
| Ethyl Alcohol | 78.5 | 78.1 |
| Methyl Ethyl Ketone | 79.6 | 73.6 |
| Isopropyl Alcohol | 82.3 | 80.4 |
| t-Butyl Alcohol | 82.8 | 79.9 |
| Methyl Propyl Ketone | 101.7 | 82.9 |
| Acetal | 103.2 | 82.6 |
| Water | 100.0 | |

In such crude ethanol cuts, the kinds and quantities of the components are greatly varied but the major components are generally ethyl alcohol, isopropyl alcohol, and methylethyl ketone. Repeated fractional distillations of the ethanol cuts were found to be of no avail for obtaining isolation of pure ethyl alcohol or pure isopropyl alcohol. The difficulties encountered can be appreciated by reference to Table II which shows the overlapping of the boiling points and by considering that these compounds form additional azeotropes with one another. With the present invention it was found possible to effect the critical separations necessary in recovering the pure alcohols freed of the other substances normally boiling in the same narrow range, even though the contaminating substances have relatively lower and higher boiling points.

To obtain the desired separation of purified organic components from any narrow-boiling range mixture like those mentioned with benefits of the present invention, the mixture may be subjected to a continuous fractional distillation in a column of practical size, including a rectification zone and a stripping zone for countercurrent vapor-liquid contact under reboiling and refluxing conditions. A sufficiently large quantity of water is introduced at an upper part of a rectification zone for effectively modifying the relative volatilities of the organic compounds to be separated, and distillation of a larger part of one component than of another from the internal reflux is effected.

The separation can be maintained under steady state conditions to obtain product streams of desired purities and constant compositions while supplying the large quantity of water feed to the upper part of the rectification zone. The temperature of this water feed is preferably close to the temperature of liquid on the water feed plate, although it may be lowered to partially condense vapors ascending to the water feed plate.

Since the efficient operation is essentially continuous, the water has to be added continuously near the top of a fractionating column while the narrow-boiling range mixture of oxygenated organic compounds to be separated is fed continuously into the column at a lower point, and while sufficient heat is provided to afford distillation throughout the column.

The feed stream of the organic compounds is preferably introduced into a fractionating column between an upper rectification section and a lower stripping section at a point where the ratio of the main organic compounds to be separated in the feed is similar to the ratio of these compounds in the internal reflux descending through the column.

The feed stream is preferably preheated to a temperature close to that of the internal liquid reflux under equilibrium boiling conditions at the point of introduction. The preheated feed stream may be liquid, partially vaporized, or completely vaporized when introduced into the fractionating column.

Vapors of the organic compounds introduced as a feed stream at the bottom part of a rectification zone in a fractionating column pass up through the rectification zone in contact with descending internal liquid reflux under equilibrium reboiling and refluxing conditions.

Due to the fact that water considerably in excess of the amount of water distilled is introduced to mix with condensate near the top of the rectification zone, the water concentration in the internal liquid reflux at the top of the rectification zone is higher than the water concentration in vapors passing up through the zone. Contrasted therewith, in normal rectification of alcohols from an aqueous feed, the water concentration diminishes rapidly toward the limiting water concentration of the aqueous azeotropes in the vapors ascending the fractionating column.

The quantity of water required to be introduced continuously at the upper part of the rectification zone for accomplishing the desired separation of the close-boiling alcohols is considerably greater than the quantity of condensate with which it becomes homogeneously mixed in order to make the water concentration of the internal reflux substantially above a critical minimum in the range of 65–85 mol per cent. With adequate water concentration in the internal reflux for effecting the separation, the organic component to be isolated in the aqueous bottoms is dissolved in the aqueous internal reflux that reaches the bottom part of the rectification zone and finally the bottom of the stripping zone.

The minimum water concentration of the internal reflux for obtaining the separation depends on the particular organic compounds to be separated. In a limiting case of isolating ethyl alcohol from isopropyl alcohol, essentially no separation is effected if the internal reflux contains less than 65 mol per cent water; and for obtaining satisfactory results on a practical scale, more than 85 mol per cent water, preferably 90–99 mol per cent water, is required in the internal liquid reflux. As the water dilution of the internal reflux becomes infinite, the selectivity of separation is increased but the efficiency is excessively lowered on account of the relatively small quantities of the organic compounds involved.

Under steady state conditions in a fractional distillation zone, the internal reflux having adequate water concentration for accomplishing the separation of the close-boiling alcohols tends to have a nearly constant water concentration in a homogeneous liquid phase at each plate and the high water concentration is approximately uniform in the internal reflux throughout the fractionation zone sections. This internal reflux in flowing from the top to the bottom becomes richer in the ethyl alcohol while the other organic components of the feed becomes distilled overhead.

The overhead vapors from the rectification zone are enriched in one or more of the organic components rendered relatively more volatile by the high water concentration in the liquid reflux while the remaining portion of the organic material introduced with the feed is dissolved in the internal reflux. Thus, if isopropyl alcohol substantially free of ethyl alcohol is withdrawn as overhead product with accompanying water vapor from the rectification zone, ethyl alcohol can be removed in the residual reflux at the same rate that the ethyl alcohol is introduced with the feed to the rectification zone.

The functioning of the stripping zone may be described as follows:

The dilute aqueous solution of the close-boiling alcohols to be separated, as in the liquid reflux from the bottom of the rectification zone, flows downwardly through the stripping zone in countercurrent contact with ascending vapors evolved from the solution under reboiling conditions. A sufficiently high concentration of water is maintained in the liquid flowing down through the stripping zone, as in the rectification zone, to make the liquid progressively richer in ethyl alcohol while the isopropyl alcohol is stripped from the liquid. Under equilibrium reboiling and refluxing conditions in the stripping zone, the isopropyl alcohol may be removed as vapor overhead from the stripping zone at the same rate that this alcohol enters the stripping zone as part of the liquid feed to this zone, and a dilute aqueous solution of the ethyl alcohol freed of isopropyl alcohol may be withdrawn from a bottom part of the stripping zone.

A variety of mechanical arrangements may be used for conducting the process, and suitable arrangements are shown diagrammatically in the drawings.

Figure 1 of the drawing illustrates a flow plan of a unit for obtaining separation of two products, e. g., a purified alcohol bottoms product and an overhead product, which are concentrated as such.

Figure 2 illustrates a flow plan on an expanded unit for accomplishing further separations of overhead products.

Referring to Figure 1, 1 represents a fractional distillation column in the interior of which is provided means for obtaining efficient countercurrent liquid-vapor phase contacting, e. g., such conventional means as bubble plates, or packing. The crude feed of mixed organic compounds, including the water-miscible alcohols to be subjected to separation, is charged to column 1 from an inlet 2 at a point at the bottom of the rectification zone. The water to be added in large quantity as a refluxing medium enters the column 1 from line 3. Overhead vapors are withdrawn from the top of column 1 through line 4 by which they are passed through condenser 5 to a receiver 6. A portion of condensate collected in receiver 6 is returned to the top part of column 1 as external reflux through line 7. The remaining portion of distillate collected in receiver 6 is withdrawn through line 8.

Bottoms liquid collected at the lower part of column 1 is passed by line 9 into a reboiler 10 for heating by indirect or direct heat exchange with a heating medium such as live steam. A portion of the bottoms liquid heated and partially vaporized in the reboiler 10 is recycled by line 11 to the lower part of column 1. The remaining portion of the bottoms liquid is withdrawn through line 12.

If sufficient fractionation is provided in a secondary rectifying zone above the water feed inlet of line 3 to column 1, the distillate collected in receiver 6 may have a composition of a water azeotrope, or approaching thereto, for the higher molecular weight or selectively volatilized organic compound distilled overhead.

With an excess of water present in the distillate with respect to the azeotropic composition, the distillate requires further processing for separation of excess water, as, for example, by azeotropic distillation or dehydration, such as may be carried out by passing the distillate through line 8 into a water stripping or concentrating column 13. Column 13 is equipped in a conventional manner with rectifying means, overhead line 14, cooling condenser 15, a distillate receiver 16, and an external reflux return line 17.

In operating the column 13 for azeotropic distillation, the aqueous azeotrope distillate is withdrawn from the system through line 18. Stripped water bottoms collected in the lower part of column 13 may be partly recycled by lines 19, 20, and 21 through a heat exchange reboiler 22 for transferring heat directly or through a heat transfer surface, and a remaining portion of the stripped water bottoms from column 13 may be passed through line 23 into the water feed line 3 of column 1, thus conserving on heat energy and makeup water.

The dilute aqueous solution of the isolated organic compound collected in the bottom of column 1 and withdrawn through line 12 may be further processed by azeotropic distillation in a water stripping or concentrating column 25. Column 25 is also equipped in a conventional manner for fractional distillation with liquid-vapor phase contacting means for fractionation, an overhead line 26 for passing overhead vapors to cooling condenser 27, a receiver 28 for distillate from the condenser, a reflux line 29 for returning a portion of distillate to the upper part of column 25, and distillate withdrawal line 30. Stripped water bottoms collected at the lower part of column 25 are recycled by lines 31, 32, and 33 through a heat exchange reboiler 34, and the remaining portion of the bottoms may be passed by line 35 into the water feed line 3 for column 1.

When water in excess of the amounts of water in overhead products 18 and 30 and that used for recycling is introduced into the system, e. g., with the feed through line 2, into any of the reboilers 10, 22, and 34 for direct heating by open steam, or any combination of these, this excess is withdrawn continuously in controlled amounts through line 36 from the bottom of column 25. Fresh makeup water may be added suitably from line 37, and a heat exchange unit 38 may be placed in line 3 for controlling the feed water temperature.

Referring to Figure 2 of the drawing, an initial narrow boiling range mixture, e. g., an aqueous mixture containing ethyl alcohol and isopropyl alcohol which are to be isolated from each other and from other components, such as tertiary butyl alcohol and methyl ethyl ketone, is fed to a first fractional distillation column 41.

In column 41 the ethyl alcohol is separated from the other organic components of the mixture. Successively, the next higher molecular weight alcohol, isopropyl alcohol, is similarly isolated from the other organic components of the distillate product from column 41 in column 42, then any tertiary butyl alcohol present in the distillate product from column 42 may be separated from methyl ethyl ketone and other organic components in column 43. Additional columns may be employed to concentrate or separate methyl ethyl ketone and other organic components in the distillate products of columns 42 and 43.

Column 41, like column 1 in Figure 1, is equipped with an organic mixture feed inlet 44 between its upper rectification section and its lower stripping section, with an upper water inlet 45, overhead vapor line 46, cooling condenser 47, external reflux line 48, and means 49 that supplies heat to the bottoms for reboiling. In this instance, an open steam line is indicated to supply heat directly for reboiling the bottoms, although indirect heat exchange could be used.

The bottoms from the separation column 41 is withdrawn by line 50 to a concentration column 51, which is equipped and operates like column 25 in Figure 1 to concentrate the isolated alcohol in dilute aqueous solution by azeotropic distillation.

Residual water is recycled by line 52 for further use as refluxing medium. Surplus water bottoms of column 51 is withdrawn through line 53. The overhead product from column 51 is passed by line 54 to cooling condenser 55, a portion of the condensed overhead product is refluxed to column 51 by line 56, and another portion of the condensate is withdrawn through line 57 as finished distillate product. A finished distillate product thus obtained is about 96 volume per cent ethyl alcohol, about 4 volume per cent water, and less than 0.1 per cent of other organic compounds as impurities.

Column 42 in Figure 2 receives as its feed the crude isopropyl alcohol distillate separated from ethyl alcohol in column 41. This crude isopropyl alcohol distillate is passed from condenser 47 through line 58 into column 42 between its upper rectification section and its lower stripping section. The crude isopropyl distillate may generally contain methyl ethyl ketone and tertiary butyl alcohol with a substantial proportion of water and several other organic components which pass overhead from column 41.

Column 42 is equipped like column 41 with an overhead vapor line 59, a cooling condenser 60, an external reflux line 61, a water feed line 62, and a bottoms heating line 63. Purified isopropyl alcohol in dilute aqueous solution is separated as bottoms in column 42 from the other organic components of the feed in substantially the same manner as the ethyl alcohol is separated in column 41 and preferably by maintaining a water concentration of 90-99 mol per cent in the internal reflux that descends through column 42.

Withdrawal line 64 passes the purified isopropyl alcohol in dilute aqueous solution to concentrating column 65 which operates like column 51 to concentrate the isolated isopropyl alcohol by azeotropic distillation. Residual water from column 65 is recycled by line 62. Surplus water bottoms of column 65 may be withdrawn through line 66. The overhead product from column 65 is passed by line 67 to cooling condenser 68 from which a portion of the distillate is refluxed by line 69. The remaining proportion of the distillate is withdrawn from the condenser by line 70 as finished product. A concentrated isopropyl alcohol thus obtained is substantially free of methyl ethyl ketone, tertiary butyl alcohol, and such other organic components initially present in the feed mixture to column 42.

Column 43 receives as its feed an aqueous distillate product withdrawn from condenser 60 by line 71. This distillate may contain tertiary butyl alcohol, methyl ethyl ketone, and other organic components in aqueous solution.

Column 43 is equipped and is operated like the preceding columns 41 and 42 for separating tertiary butyl alcohol from methyl ethyl ketone and the other organic components present in the feed delivered by line 71. The feed enters column 43 between its upper rectification section and lower stripping section. Water is charged into the upper part of the column by line 72. Overhead vapors are passed by line 73 to cooling condenser 74, from which a portion of overhead distillate is returned to column 43 by reflux line 75. Heat for reboiling is supplied by steam from line 76.

By maintaining a suitably high water concentration, preferably of 90-99 mol per cent, in the internal reflux descending through column 43, purified tertiary butyl alcohol dissolved in the water bottoms is isolated from the other organic compounds of the feed. The bottoms of column 43 are withdrawn by line 77 to the concentrating column 78 for azeotropic distillation of the alcohol. Column 78 is equipped with overhead vapor line 79, cooling condenser 80, external reflux line 81, and product withdrawal line 82. Water bottoms are recycled from column 78 by line 72 for further use as refluxing medium in column 43. Surplus water bottoms of column 78 are withdrawn through line 89.

The concentrating columns 51, 65, and 78 are provided with lines 83, 84, and 85 which supply steam for reboiling. The lines 52, 62, and 72 used for recycling the water bottoms are provided with pumps 86, 87, and 88, respectively. Other equipment of conventional types useful in fractional distillation apparatus may be employed even though omitted from the drawing for the sake of simplicity.

By operating the overhead condensers of each separating column in a series e. g. the condensers 47, 60, and 74 shown in Figure 2, the overhead products forwarded as from column 41 to column 42, and from column 42 to column 43 may be maintained partly or entirely in vapor phase to thus reduce heating requirements.

Data obtained in the application of the process for the removal of isopropyl alcohol from ethyl alcohol in a narrow boiling aqueous mixture of these alcohols clearly demonstrate that the admixture of sufficiently large amounts of water with the reflux in the fractional distillation zone makes the isopropyl alcohol much more volatile than the ethyl alcohol and is able to reduce the isopropyl alcohol in the bottoms to a very low concentration, even to the extent that the isopropyl alcohol is not detectable in the residual ethyl alcohol solution.

Representative data are given in the following tables:

TABLE III

*Relative volatilities of isopropyl alcohol (IpOH) to ethyl alcohol (EtOH) in presence of excess water*

[92 mol per cent H$_2$O in liquid phase alcohol analyses expressed on water-free basis.]

| Equilibrium Mixture | Phase | Mol Per Cent H$_2$O | Mol Per Cent EtOH | Mol Per Cent IpOH | Relative Volatility [1] IpOH to EtOH (Alpha) |
|---|---|---|---|---|---|
| 1 | Vapor | | 7.6 | 92.4 | 1.46 |
|   | Liquid | 92 | 10.7 | 89.3 | |
| 2 | Vapor | | 15.6 | 84.4 | 1.44 |
|   | Liquid | 92 | 21.0 | 79.0 | |
| 3 | Vapor | 52 | 42.7 | 57.3 | 1.44 |
|   | Liquid | 92 | 50.6 | 49.4 | |
| 4 | Vapor | 54 | 68.4 | 31.6 | 1.55 |
|   | Liquid | 92 | 77.0 | 23.0 | |
| 5 | Vapor | 56 | 81.5 | 18.5 | 1.62 |
|   | Liquid | 92 | 87.6 | 12.4 | |
| 6 | Vapor | 56 | 93.1 | 6.9 | 1.72 |
|   | Liquid | 92 | 95.9 | 4.1 | |

[1] The relative volatility is the volatility of one component divided by that of the other, the volatility of each component being proportional to its partial pressure divided by its mol fraction in the liquid phase. It is also defined by the equation Alpha = $(y_1/y_2)/(x_1/x_2)$ where $y$ refers to the vapor phase mol fractions of the components to be separated and $x$ refers to the liquid phase mol fractions of the components to be separated, subscript one designates the more volatile component and subscript two the less volatile component.

TABLE IV

*Relative volatilities of isopropyl alcohol to ethyl alcohol in presence of excess water*

[97 mol per cent $H_2O$ in liquid phase alcohol analyses expressed on water-free basis.]

| Equilibrium Mixture | Phase | Mol Per Cent $H_2O$ | Mol Per Cent EtOH | Mol Per Cent IpOH | Alpha IpOH to EtOH |
|---|---|---|---|---|---|
| 1 | Vapor | 63 | 7.9 | 92.1 | 1.54 |
|   | Liquid | 96 | 11.6 | 88.4 |  |
| 2 | Vapor |  | 14.5 | 85.5 | 1.54 |
|   | Liquid | 96 | 20.7 | 79.3 |  |
| 3 | Vapor | 64 | 40.5 | 59.5 | 1.55 |
|   | Liquid | 97 | 51.2 | 48.8 |  |
| 4 | Vapor | 69 | 80.6 | 19.4 | 1.77 |
|   | Liquid | 97 | 88.0 | 12.0 |  |
| 5 | Vapor |  | 91.7 | 8.3 | 1.80 |
|   | Liquid |  | 95.2 | 4.8 |  |
| 6 | Vapor | 71 | 93.3 | 6.7 | 1.84 |
|   | Liquid | 97 | 96.3 | 3.7 |  |

The data in Tables III and IV indicate very clearly that the large proportion of water present in the liquid phase with the mixed alcohols increases the relative volatility of the higher molecular weight isopropyl alcohol with respect to the lower molecular weight ethyl alcohol, regardless of which alcohol is in preponderance initially.

To confirm that complete separation of isopropyl alcohol from ethyl alcohol is practicable in a continuous fractional distillation column operated in accordance with principles outlined, a column with rectifying and stripping sections, an intermediate feed section, a top water feed section, and condenser was used. Aqueous blends of isopropyl alcohol and ethyl alcohol and blends with other close-boiling oxygen-containing compounds were subjected to continuous fractional distillation in the column supplied near the top with water.

For the purpose of illustration but without limiting the invention, the following examples are given:

EXAMPLE 1

An alcohol blend of 4.6 weight per cent isopropyl alcohol in ethyl alcohol with 5 weight per cent water was used as the feed to the continuous fractional distillation column having two 30-plate sections. With the alcohol mixture feed rate maintained at 52 volumes per hour to a point between the two sections, water preheated to 90° C. was fed into the top of the column at a flow rate of 2100 volumes per hour. The external reflux ratio was somewhat higher than 30:1. After equilibrium conditions were obtained in the column, the isopropyl alcohol concentration in the aqueous ethyl alcohol bottoms was maintained below 0.1 weight per cent alcohol basis, which is well below the specification requirements on high-quality ethyl alcohol.

EXAMPLE 2

In a run carried out in the same manner as in Example 1, a small amount of methyl ethyl ketone was included in the feed in additon to isopropyl alcohol and ethyl alcohol. No detectible concentration of methyl ethyl ketone or isopropyl alcohol was found in the aqueous ethyl alcohol bottoms after equilibrium conditions were reached, thus indicating that the ketone actually facilitated the isolation of ethyl alcohol.

EXAMPLE 3

In another run carried out in the same manner as Example 1, an ethanol cut from a Fischer synthesis water layer product containing components of the types indicated in Table II was fractionally distilled with 98 mol per cent water in the liquid phase. After the column was run continuously for a period to reach steady state conditions, no appreciable amount of isopropyl alcohol was detectible in the aqueous ethyl alcohol bottoms withdrawn from the fractionating column. One-half per cent methanol was detected in the alcohol content of the bottoms but this was reduced to less than 0.01 weight per cent on an alcohol basis by topping the ethyl alcohol product concentrated from the bottoms.

The overhead distillate product of the fractionating column has a pungent odor. An analysis on a composite of overhead samples showed the presence of 1.4% acetal, 3.2% aldehyde, and 3.45% methyl ethyl ketone with the distilled isopropyl alcohol. No carbonyl compounds were detectible in the ethyl alcohol bottoms. Thus, it was clearly demonstrated that it was possible to produce specification pure ethyl alcohol from crude water solution products of a Fischer synthesis.

EXAMPLE 4

In purifying the isopropyl alcohol as contained in the overhead products of the ethyl alcohol separation column, the close-boiling impurities are similarly rendered more volatile and distilled overhead.

Analytical distillation data on a crude isopropyl alcohol feed to a fractional distillation column in which the reflux ratio was 20:1 and a concentration of 92 mol per cent water was maintained in the internal reflux indicated nearly complete separation. With as much as 66.7 vol. per cent methyl ethyl ketone on a water-free basis in the feed, the bottoms contained over 98 weight per cent isopropyl alcohol on a water-free basis and the overhead was free of isopropyl alcohol.

Also, with tertiary butyl alcohol present in isopropyl alcohol feed under equilibrium conditions with 91 mol per cent water in the liquid phase, it was found that the relative volatility of t-butyl alcohol over isopropyl alcohol is about 1.4.

EXAMPLE 5

Analytical data on the separation of methyl ethyl ketone from t-butyl alcohol showed that with 91 mol per cent water maintained in the liquid phase the relative volatility of the ketone over this alcohol is of the order of 1.7. Thus, t-butyl alcohol is readily separated from methyl ethyl ketone with no ethyl alcohol or isopropyl alcohol present in the feed to the column used for separating the t-butyl alcohol.

EXAMPLE 6

By simple distillation of aqueous phase products from Fischer syntheses, six distinct distillates boiling below 100° C. were obtained. A representative fractionation of such product is shown in the following table:

TABLE V

*Cuts from fractional distillation of aqueous layer product of synthesis*

[At 350° C., 238 p. s. i. g., 3H/CO, 1.9 gas recycle over iron catalyst.]

| Cut | Vapor Temp., °C. | Major Components |
|---|---|---|
| 1 | to 42 | Acetaldehyde, Methanol. |
| 2 | 42–52 | Propionaldehyde, Ester. |
| 3 | 52–69 | Acetone, Acetal, Methanol. |
| 4 | 69–82 | Ethanol, Isopropanol, Ketones. |
| 5 | 82–92 | n-Propanol, iso- and sec-Butanols. |
| 6 | 92–98 | Water, higher alcohols. |

A typical ethanol cut boiling from about 69° to 82° C. thus obtained comprised about 5 weight per cent water, 72.5 weight per cent ethyl alcohol, 5.3 weight per cent isopropyl alcohol, 11.3 weight per cent ketones, 0.2 weight per cent t-butyl alcohol and other neutral organic substances identified as in Table II. By subjecting this cut to fractional distillation with 90-99 mol per cent water in the internal liquid reflux as described in Example 3, ethyl alcohol recovered in the bottoms was over 99.5% pure on an anhydrous basis.

By further distillation of the overhead distillate containing isopropyl alcohol with use of high water concentrations (90-99 mol per cent) in the internal reflux as described in Example 4, it was found possible to obtain a similar isolation of isopropyl alcohol from the ketones and the other organic components, or if desired, to separate an aqueous bottoms in which only isopropyl alcohol and t-butyl alcohol remained.

The process of this invention can also be used for making less exact separations of the alcohols, than illustrated in the above examples, in which simply the relative proportions of the alcohols are altered by distillation through a series of stages in which a high water content is maintained in the refluxing liquid phase, the number and efficiency of the stages determining the degree of the separation obtained. This process can thus be used for the complete or partial separation, as desired, of any mixture of aqueous azeotrope-forming, water-miscible alcohols, especially those of 2 to 4 carbon atoms per molecule, with or without the presence of other neutral oxygenated organic compounds, even when these or their azeotropes with water have boiling points close to or within the range of the alcohol-water azeotropes in the mixture being separated. If the initial alcohol mixture contains methyl alcohol, it can be separated from the remaining alcohols either by initial fractionation of the mixture or by subsequent distillation of the distillate and residual fractions obtained in the present process. This is possible because of the relatively low boiling point (64.7° C.) of methyl alcohol and the fact that it does not form an azeotrope with water.

The use of salt dissolved in the water refluxing medium makes it possible to further increase the relative volatility spread of the close-boiling alcohols. Salt solutions offer the further advantage of satisfactorily lowering the concentration of water in the overhead product, the salt being selected with care to avoid undesired effects of corrosion and catalyzing the reactions of organic compounds.

Although generally the fractional distillation is to be carried out at about atmospheric pressure, it may also be carried out at pressures below or above atmospheric pressure.

As already mentioned, the overhead and bottoms products from the fractional distillation in the presence of excess water can be further processed to remove water by physical and/or chemical dehydrating, e. g., azeotropic distillation treatment, with chemical drying agents, or the like.

We claim:

1. The method of separating water-miscible alcohols which form close-boiling aqueous azeotropes difficult to separate by ordinary fractional distillation in having boiling points which differ by less than 5° C., one of said alcohols having a higher molecular weight than the other, which comprises continuously introducing a feed mixture of said alcohols to a fractional distillation zone wherein vapors of said alcohols with water vapor ascend countercurrently to liquid reflux of the alcohols dissolved in a sufficiently higher proportion of water to effect vaporization of a larger part of the higher molecular weight alcohol than of the other alcohol in said reflux, continuously introducing water at an upper part of the fractional distillation zone to maintain at least 65 mol per cent water in said liquid reflux, continuously removing vapor of the higher molecular weight alcohol with water vapor overhead from the fractional distillation zone, and removing a dilute aqueous solution of the other alcohol as bottoms.

2. The process of separating water-miscible alcohols from a mixture with other oxygenated organic compounds, particularly of the class consisting of ketones, aldehydes, esters, ethers, ketals, and acetals, that form close-boiling azeotropes difficult to separate by ordinary fractional distillation in having boiling points which differ by less than 5° C., which comprises continuously introducing a feed mixture of the alcohols with said other compounds to a rectification zone wherein vapors of the feed mixture ascend countercurrently in contact with liquid reflux of condensate from said vapors with increased water content, increasing the water content of condensate at an upper part of the rectification zone by introducing water continuously thereto in excess of the amount of water being distilled from said zone so that the liquid reflux contains at least 65 mol per cent water, flowing internal liquid reflux from a bottom part of the rectification zone countercurrently in contact with vapors boiled from the internal liquid reflux as it flows down to a bottom part of the stripping zone, and withdrawing from the bottom part of the stripping zone a dilute aqueous solution of one of said alcohols freed of other organic components of the feed mixture.

3. In a process of separating ethyl alcohol from isopropyl alcohol, the steps which comprise continuously passing a dilute aqueous solution of ethyl alcohol containing isopropyl alcohol down through a stripping zone so that a liquid portion of said solution flows countercurrently in contact with vapors evolved therefrom under constant refluxing and reboiling conditions, maintaining a sufficiently high concentration of at least 65 mol per cent water in the resulting internal reflux to effect vaporization of a larger part of the isopropyl alcohol than of the ethyl alcohol in said reflux, continuously withdrawing vapors of water mixed with vapors of the alcohols overhead from the stripping zone, the isopropyl alcohol being thus withdrawn as vapor at the same rate that the isopropyl alcohol dissolved in said aqueous solution enters the stripping zone, and withdrawing from a bottom part of the stripping zone a dilute aqueous solution of ethyl alcohol substantially free of isopropyl alcohol.

4. In a process of separating alcohols mutually miscible with water and which form close-boiling aqueous azeotropes difficult to separate by ordinary fractional distillation in having boiling points which differ by less than 5° C., the steps which comprise continuously passing into an upper part of a stripping zone a dilute aqueous solution of the alcohols so that a liquid portion of said solution flows downwardly through the stripping zone in countercurrent contact with vapors evolved from the solution under constant refluxing and reboiling conditions, maintaining a sufficiently high concentration of at least 65 mol per cent water in the resulting internal reflux to effect vaporization of a larger part of one of said alcohols than of another of said alcohols having a lower molecular weight, the alcohol thus rendered more volatile being withdrawn overhead as vapor at the same rate that this alcohol dissolved in the aqueous solution enters the stripping zone, and withdrawing from a bottom part of the stripping zone a dilute aqueous solution of said alcohol having a lower molecular weight substantially free of the alcohol rendered more volatile.

5. In a process as described in claim 4, the concentration of water maintained in the internal reflux being of the order of 90 to 99 mol per cent.

6. In a process as described in claim 4, the alcohols mutually miscible with water including isopropyl alcohol and tertiary butyl alcohol.

7. In a process of separating alcohols mutually miscible with water and which form close-boiling aqueous azeotropes difficult to separate by ordinary fractional distillation in having boiling points which differ by less than 5° C., the steps which comprise continuously passing vapors of said alcohols up through a rectification zone wherein the alcohol vapors mixed with water vapor ascend in contact with a countercurrent internal reflux containing condensate from said vapors with increased water content, giving the internal reflux its increased water content of at least 65 mol per cent thereof by continuously introducing liquid water into condensate at an upper part of the rectification zone, said liquid water being heated to a temperature adequately high to keep the condensate mixed therewith in a substantially smaller proportion steadily boiling, continuously removing overhead from said rectification zone the vapor of one of said alcohols volatilized to a greater extent than another of said alcohols having a lower molecular weight by the increased water content of the internal reflux, and continuously withdrawing from a bottom part of said rectification zone residual internal reflux which is a dilute aqueous solution of the alcohols.

8. In a process as described in claim 7, the water content of the internal reflux being of the order of 90 to 99 mol per cent.

9. In a process as described in claim 7, isopropyl alcohol being one of the alcohols volatilized to a greater extent, and ethyl alcohol being the other alcohol having a lower molecular weight.

10. In a process as described in claim 7, tertiary butyl alcohol being one of the alcohols volatilized to a greater extent.

11. In a process of separating ethyl, isopropyl, and tertiary butyl alcohols from a mixture of these alcohols, the steps which comprise fractionally distilling the mixture in a first fractional distillation zone wherein internal liquid reflux has a water concentration of 90 to 99 mol per cent, withdrawing as bottoms of first fractional distillation zone a dilute aqueous solution of the ethyl alcohol, removing as overhead distillate from said first fractional distillation zone an aqueous solution of the isopropyl and tertiary butyl alcohols, fractionally distilling said distillate in a second fractional distillation zone wherein internal liquid reflux has a water concentration of 90 to 99 mol per cent, withdrawing as bottoms of said second fractional distillation zone a dilute aqueous solution of the isopropyl alcohl, and distilling tertiary butyl alcohol overhead from said second fractionation zone.

12. In a process of separating isopropyl alcohol and methyl ethyl ketone from ethyl alcohol, the steps which comprise fractionally distilling isopropyl alcohol with methylethyl ketone from a mixture containing ethyl alcohol in a fractional distillation zone wherein internal liquid reflux is given a water concentration of 90 to 99 mol per cent, and withdrawing as bottoms a dilute aqueous solution of ethyl alcohol substantially freed of isopropyl alcohol from the fractional distillation zone.

13. A process of isolating an alcohol from aqueous solution products synthesized by reaction of carbon monoxide with hydrogen, the steps which comprise fractionally distilling from said products a narrow boiling cut containing neutral oxygenated organic compounds including alcohol components which form aqueous azeotropes that differ in boiling points by less than 5° C., selectively distilling organic components of said cut in a fractional distillation zone by maintaining a water concentration of 90 to 99 mol per cent in liquid internal reflux within the zone to where the internal reflux contains one of the alcohol components to be isolated and is stripped of the other organic compounds to be separated therefrom.

EDWIN R. GILLILAND.
CHARLES E. MORRELL.
CARL S. CARLSON.
NAT C. ROBERTSON.

REFERENCES CITED

The following references are of record in the file of this patent:

UNITED STATES PATENTS

| Number | Name | Date |
|---|---|---|
| 2,290,442 | Metzl | July 21, 1942 |
| 2,348,683 | McKenna | May 9, 1944 |
| 2,386,058 | Patterson et al. | Oct. 2, 1945 |
| 2,392,534 | Von Keussler | Jan. 8, 1946 |

FOREIGN PATENTS

| Number | Country | Date |
|---|---|---|
| 598,346 | Great Britain | Feb. 17, 1948 |